United States Patent Office 2,904,138
Patented Sept. 15, 1959

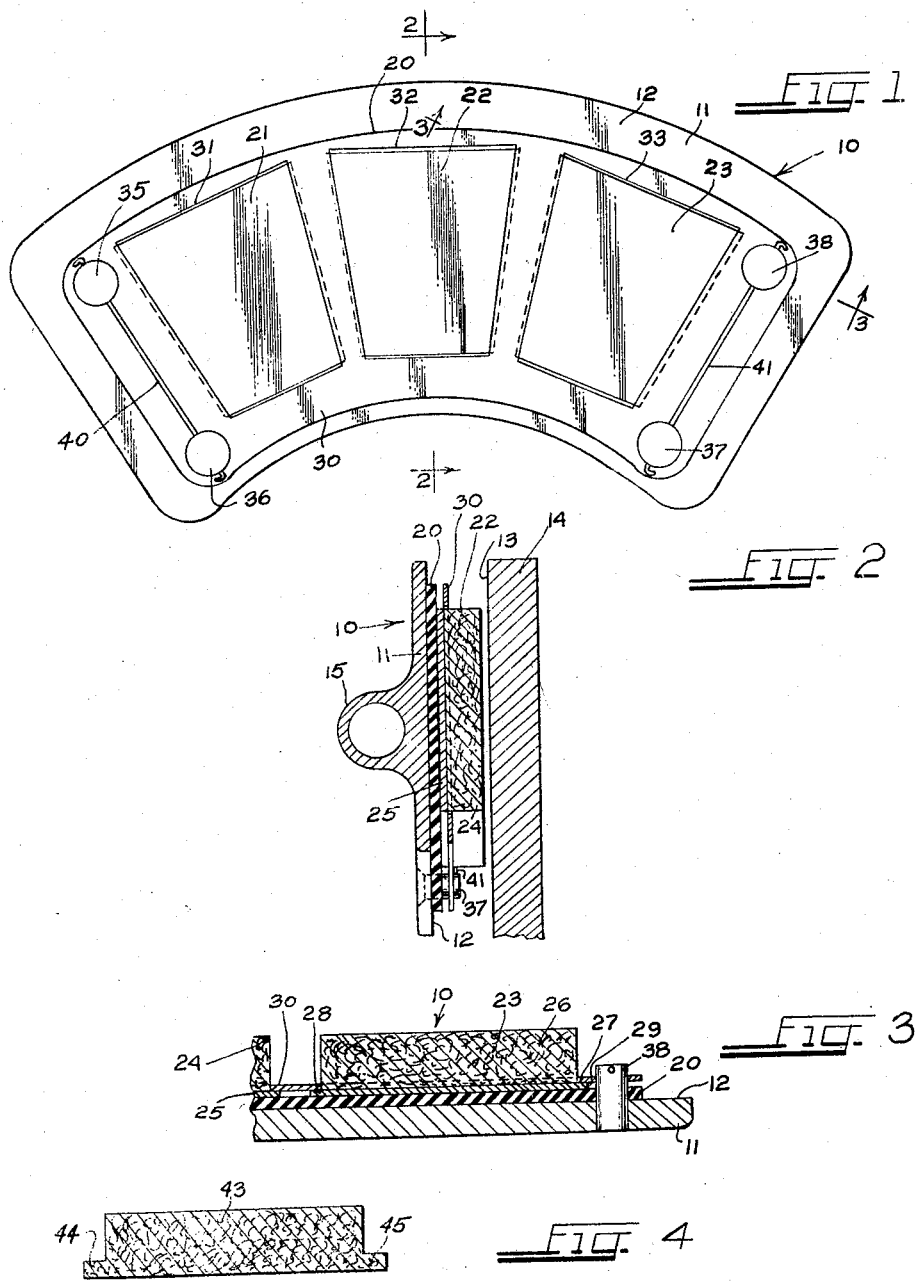

2,904,138
BRAKE SHOES

Rosser L. Wilson, Mahwah, N.J., assignor to American Brake Shoe Company, New York, N.Y., a corporation of Delaware Application February 26, 1957, Serial No. 642,445

1 Claim. (Cl. 188—251)

This invention relates to a new and improved brake unit and particularly to a brake unit adapted to engage a radial surface of a brake rotor in frictional braking contact. The invention is particularly useful in relatively heavy duty applications such as the braking of railway vehicles and will be described in that connection.

In general, braking in railway vehicles has been accomplished with clasp-type brakes which directly engage the peripheral surface of the wheel of the vehicle. Although brakes of this type have in general given extremely satisfactory service, as evidenced by their continuing standardized use on the vast majority of railroad engines and cars, as well as on other railway vehicles such as self-propelled cars and the like, there has been a considerable amount of experimentation in the railroad industry relating to other types of brakes. One braking system which has been seriously considered for use on railway equipment, and which has been placed in commercial service on a limited number of railway vehicles, utilizes the so-called disc-type brake. In a disc-type braking system, a separate rotor or disc is usually affixed to the railway axle for rotation with the wheel and is engaged by one or more brake shoes which may, for example, be coupled to a hydraulic actuating mechanism. These brake shoes do not engage the peripheral surface of the disc or rotor; rather, in the course of the braking operation, they are brought into frictional braking contact with a radial surface of the brake disc. Usually, the disc is constructed as a self-cooling device in that it impels air through or over its surfaces as it rotates with the wheel.

Disc-type braking systems have afforded relatively difficult problems with respect to the mounting and construction of the friction elements or brake shoes which engage the brake rotor. For effective braking action, it is essential that a relatively large portion of the brake shoe engage the radial surface of the disc or rotor; consequently, it is highly desirable that the brake unit afford some means for compensating for angular displacement of the brake shoe with respect to the rotor. In addition, and as in other heavy duty braking arrangements, it is highly desirable that the brake unit afford some means for absorbing the initial shock to which the brake shoe is subjected at the time the brakes are applied. Moreover, the brake unit must afford some means for resisting the torque applied thereto in the course of the braking action.

Certain prior art arrangements have afforded the requisite means for shock absorption, torque transmission, and brake shoe alignment. These arrangements, although useful to a certain extent, have not proved completely satisfactory, with the result that the brake units have required relatively frequent replacement and have sometimes damaged the brake rotors with which they work. Other prior art arrangements, although showing somewhat better performance characteristics, have been relatively expensive in construction.

A primary object of the invention, therefore, is the provision of a new and improved brake unit for a disc-type braking system.

Another object of the invention is a new and improved brake unit for engaging a radial surface of a brake rotor which is simple and convenient in construction and affords maximum economy with respect to maintenance cost for the braking system.

Another object of the invention is a new and improved brake unit for a disc-type braking system which affords maximum life for the friction elements or brake linings thereof and which accordingly minimizes brake shoe replacement.

The invention thus relates to a brake unit for engaging a radial surface of a brake rotor in frictional braking contact. A brake unit constructed in accordance with the invention comprises a brake head of substantially arcuate configuration adapted to be supported with one face thereof in juxtaposition to the radial surface of the brake rotor. A resilient rubber element is supported on the brake head face; this resilient rubber pad covers a major portion of the brake head face and preferably is also of substantially arcuate configuration. A plurality of segmental friction elements or brake shoes are supported upon the rubber pad, each of these brake shoes including at least a pair of flanges extending from different sides of the brake shoe at the base thereof. A sheet metal retaining plate having a corresponding plurality of apertures essentially similar in dimensions and in configuration to the unflanged portions of the segmental brake shoe is included in the brake unit, which also comprises means for releasably securing that retaining plate upon the brake head in retaining engagement with the brake shoe flanges. Thus, the sheet metal retaining plate holds the brake shoes in position on the resilient rubber pad; it is also utilized to transmit braking torque from the shoes to the brake head.

Other and further objects of the present invention will be apparent from the following description and claim and are illustrated in the accompanying drawing which, by way of illustration, shows preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a plan view of a brake unit constructed in accordance with a preferred embodiment of the invention and shows the friction elements or brake shoes which comprise a part of the brake unit;

Fig. 2 is a sectional view taken along line 2—2 in Fig. 1 and illustrates the manner of engagement of the brake unit with a radial surface of a brake rotor;

Fig. 3 is a longitudinal section view of the brake unit taken along line 3—3 in Fig. 1; and Fig. 4 is a cross sectional view, similar to Fig. 3, of an alternative brake shoe construction which may be utilized in the brake unit of Figs. 1–3.

The brake unit 10 shown in Figs. 1–3, which comprises a preferred embodiment of the invention, includes a brake head or support member 11 which is adapted to be supported with one face 12 thereof in juxtaposition to the radial surface 13 of a brake disc or rotor 14 as shown in Fig. 2. The brake disc or rotor 14 may be of any suitable size, configuration, and construction; inasmuch as the construction employed for members of this type is subject to wide variation, the brake rotor has been shown as a simple metal disc. It will be understood, of course, that the brake rotor may be of the self-ventilating type as described generally hereinabove or may be of any other construction suitable for heavy duty brake service. In some applications, the brake rotor 14 may comprise one of the wheels of a vehicle such as a railway car.

The brake head 11 is provided with one or more connecting lugs or other similar connecting members such as the lug 15 illustrated in Fig. 2. Lug 15, or other suitable connecting means, is utilized to connect the brake head 11 to a suitable brake-operating mechanism. Because the present invention is not concerned with nor restricted to any particular operating mechanism, the brake actuating system has not been shown in the drawings. It should be understood that the number and disposition of the connecting lugs on brake head 11 is not critical and that any suitable mounting arrangement for the brake head may be employed without departing in any way from the inventive concept.

A relatively large resilient pad 20 is included in brake unit 20 and is supported upon the brake head face 12. The pad 20 is also preferably of arcuate configuration and overlies a major portion of the brake head surface 12. Pad 20 may be formed from natural rubber, synthetic rubber, or any other material which is substantially resilient in nature and adapted to function as a shock-absorbing medium for the brake unit.

The brake unit 10 further includes a plurality of segmental brake shoes 21, 22 and 23 which are supported upon the rubber pad 20 and which, as indicated in Fig. 2, engage the brake rotor 14 in frictional braking contact when the brake unit is placed in operation. Each of the brake shoes 21—23 comprises a friction element or brake lining and a metal backing member to which the brake lining is affixed. Thus, as indicated in Fig. 2, the brake shoe 22 comprises the friction element 24 which is bonded to the metal backing plate 25; brake shoe 23 comprises a brake lining or friction element 26 affixed to a metal backing plate 27. Moreover, and as shown in Fig. 3, the metal backing plate 27 is somewhat wider than the friction element 26, thereby affording a pair of flanges 28 and 29 at the opposite sides of the brake shoe. Each of the other two brake shoes 21 and 22 is also constructed to afford similar flanges as indicated by the dash outlines in Fig. 1. The friction elements of the brake shoes may be secured to the metal backing plates by conventional cementing or bonding techniques or may be riveted thereon in accordance with known practices. The friction elements themselves may be formed of molded composition materials or may be of woven construction; in some instances, it may be desirable to use both types of friction element in a single brake unit.

A sheet metal retaining plate 30 is included in the brake unit and is utilized to secure the brake shoes thereon. Thus, the retaining plate 30 is provided with a plurality of apertures 31, 32 and 33 which are essentially similar in dimensions and configuration to the unflanged or friction element portions of the brake shoes 21, 22 and 23 respectively. Retaining plate 30 is in turn affixed to the brake head 11 by means comprising a plurality of studs or posts 35, 36, 37 and 38. As best shown in Fig. 3, each of these studs is riveted or otherwise affixed to the brake head and extends upwardly from the face 12 thereof through a suitable aperture in the retaining plate 30 as well as through the rubber pad 20. The retaining plate may be held in its desired position by simple fastening means such as a plurality of cotter keys or the safety wires 40 and 41 shown in Fig. 1.

Construction of the brake unit 10 is extremely simple and economical. The brake head 11 is preferably formed as a single steel casting, the posts or studs 35—38 being riveted, welded or otherwise affixed to the casting in its finished form. The rubber pad 20 may be cut from sheet rubber stock and is preferably bonded to the face 12 of the brake head. Retaining plate 30 may be simply and economically fabricated from sheet metal stock by a simple punch press operation. To assemble the brake unit, it is only necessary to position the brake shoes 21—23 upon the rubber pad 20, bring retaining plate 30 into position engaging the flanges of the individual brake shoes and also engaging studs 35—38, and then secure the assembly together as by the safety wires 40, 41.

The rubber pad 20 permits each of the brake shoes to tip or cant itself independently of the others, thereby assuring uniform engagement of the full braking surface with the radial face 13 of brake rotor 14 in the event that the brake head becomes angularly displaced with respect to the brake rotor. Braking torque is transmitted from the brake shoes to the retaining plate 30 and from the plate 30 to the brake head 11 through the studs 35—38. Replacement of any one or all of the brake shoes is a simple and expedient matter, as indicated by the assembly procedure outlined immediately above. The rubber pad 20 also serves effectively as a shock absorber for the brake unit and prevents fracturing of the brake shoes from the shock of initial contact with the rapidly rotating brake disc.

In most instances, it is desirable to utilize a metal plate such as the plate 28 as a backing member for each of the brake shoes in order to assure adequate strength in the flanges which maintain the shoes in position on the brake unit. In some instances, however, and particularly where the braking service is relatively light and excessive vibrational and shock stresses are not encountered, this metal backing plate may be eliminated. For such braking applications, a brake shoe or friction element of the type illustrated in Fig. 4 may be employed. The brake shoe 43, which may be of suitable composition material, is molded or otherwise fabricated in a form which affords integral flanges 44 and 45 at the opposite sides thereof but is not provided with a metal backing plate. Brake shoes of this type may be substituted directly in the brake unit for the metal-backed shoes described hereinabove. This construction is somewhat more economical than that of Figs. 1–3 and, as indicated hereinabove, is suitable for braking applications other than those in which the brake unit is subject to relatively heavy vibrational and other stresses.

Hence while I have illustrated and described the preferred embodiments of my invention, it is to be understood that this is capable of variation and modification, and I therefore do not wish to be limited to the precise details set forth, but desire to avail myself of such changes and alterations as fall within the purview of the following claim.

I claim:

A brake unit for engaging a radial surface of a brake rotor in frictional braking contact, said brake unit comprising: a brake head of substantially arcuate configuration adapted to be supported with one face thereof in juxtaposition to said radial surface of said brake rotor; a resilient rubber element of arcuate configuration supported on said one brake head face and overlying a major portion thereof; a plurality of segmental brake shoes, each comprising a sheet metal carrier member and a frictional element affixed to one face of said carrier member, supported upon said resilient rubber element, said carrier member in each of said segmental brake shoes extending beyond at least two different sides of said brake shoe to form flanges at the base thereof; a sheet metal retaining plate having a corresponding plurality of apertures essentially similar in dimensions and configuration to the unflanged portions of said segmental brake shoes; and means for releasably securing said retaining plate upon said brake head in retaining engagement with said brake shoe flanges to maintain said brake shoes in position on said resilient rubber element and to transmit braking torque from said brake shoes to said brake head.

References Cited in the file of this patent

UNITED STATES PATENTS

| | | |
|---|---|---|
| 1,716,393 | Thompson | June 11, 1929 |
| 1,752,377 | Glueck | Apr. 1, 1930 |
| 2,214,762 | Eksergian | Sept. 17, 1940 |
| 2,406,543 | Hunter | Aug. 27, 1946 |
| 2,451,326 | Eksergian et al. | Oct. 12, 1948 |